Dec. 9, 1930.                H. C. HAYES                1,784,439
                METHOD FOR MAKING SUBTERRANEAN SURVEYS
                Filed May 15, 1928        3 Sheets-Sheet 1
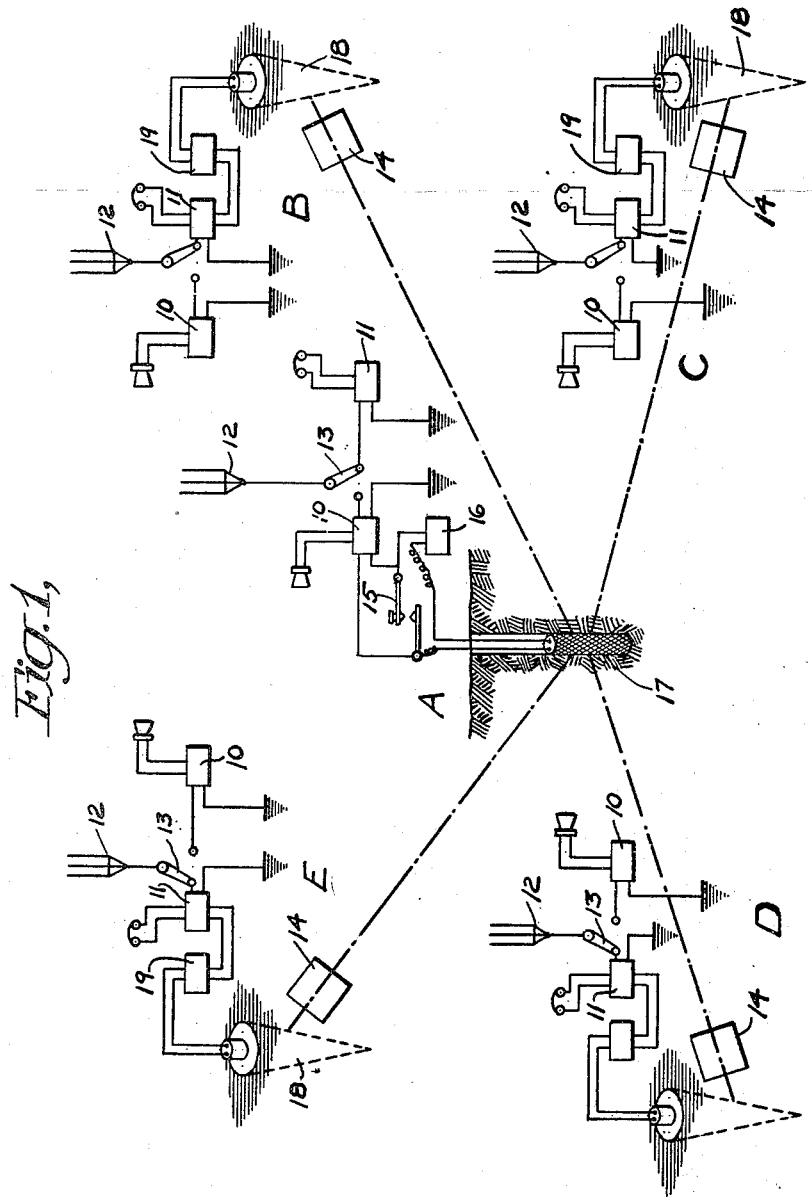
Inventor
Hervey C. Hayes
By Attorney
Harold Dodd Dec. 9, 1930. H. C. HAYES 1,784,439
METHOD FOR MAKING SUBTERRANEAN SURVEYS
Filed May 15, 1928 3 Sheets-Sheet 2
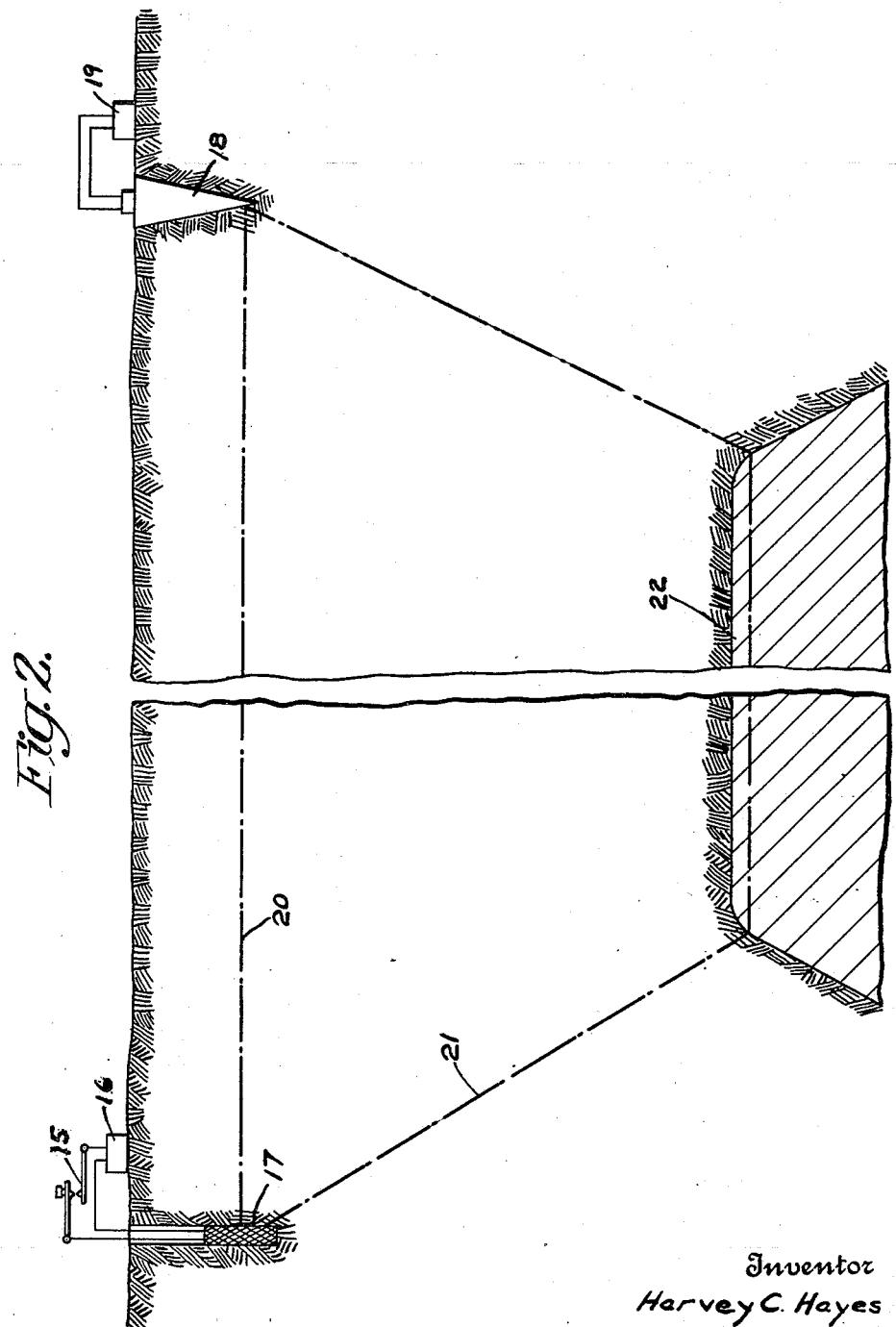
Inventor
Harvey C. Hayes
By Attorney

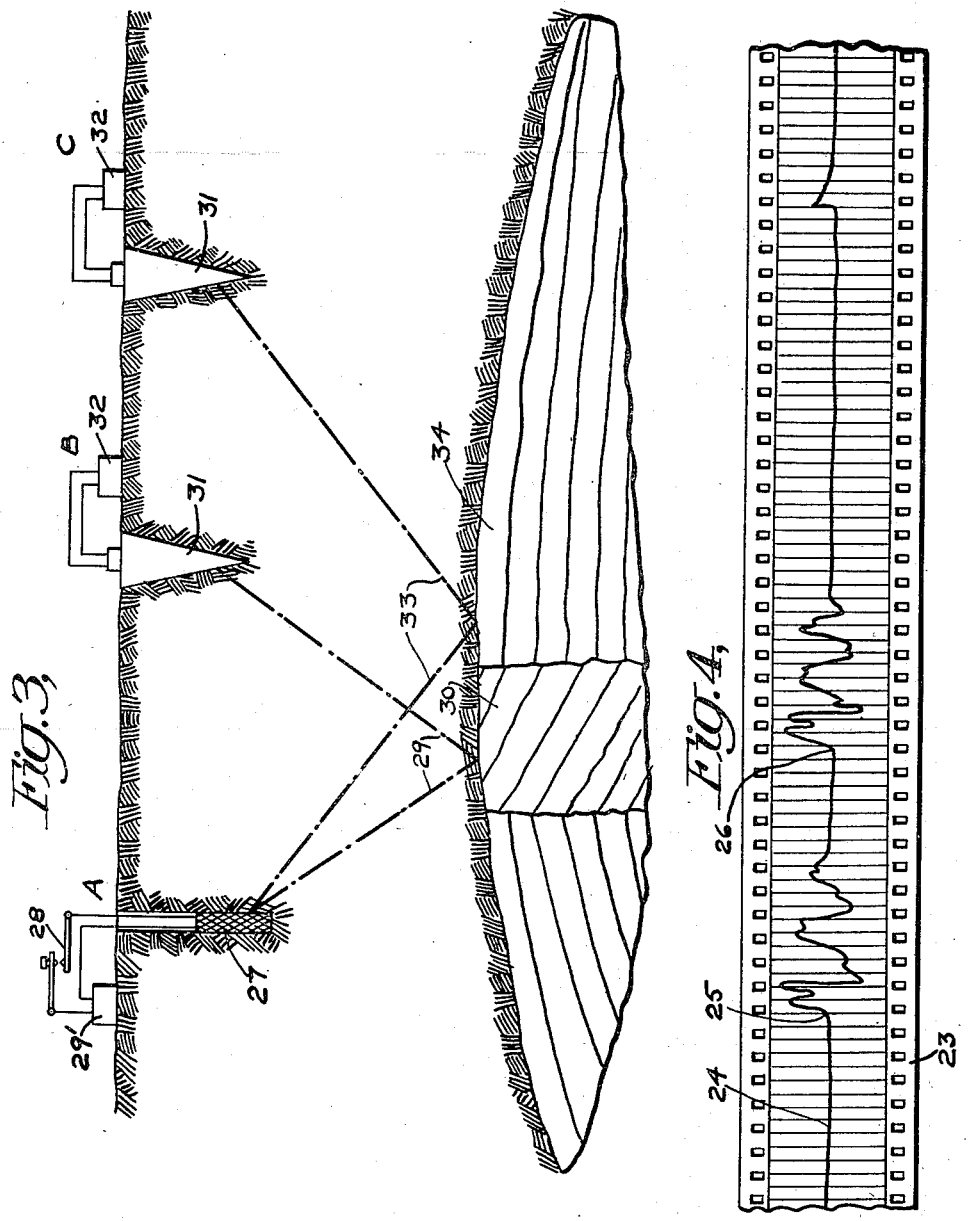

Patented Dec. 9, 1930

1,784,439

UNITED STATES PATENT OFFICE

HARVEY C. HAYES, OF WASHINGTON, DISTRICT OF COLUMBIA

METHOD FOR MAKING SUBTERRANEAN SURVEYS

Application filed May 15, 1928. Serial No. 277,968.

(GRANTED UNDER THE ACT OF MARCH 3, 1883, AS AMENDED APRIL 30, 1928; 370 O. G. 757)

It has been a primary object of the present invention to provide a new method and arrangement of apparatus for the study of the earth's surface by geophysical means. Heretofore, methods of various kinds have been suggested and to a certain extent put into practice, whereby advantage has been taken of variations in the different physical properties of the earth's crust, such as have been found to take place in accordance with the nature of the structure from point to point. Some of these methods have depended on variations in the gravitational force that are brought about by the presence of different formations in the earth's crust which give rise to differences in density. Other methods have relied upon differences in the electrical conductivity of the substances encountered or upon peculiarities in the magnetic properties of these substances.

Another property of the materials forming the earth's crust, which has been relied upon to some extent within recent years in exploration work of the type under consideration, is their elasticity which determines to a large extent the speed of travel of sound or similar waves through the earth. Methods of determinating the earth's structure, which have depended upon this elastic property of materials, have been based upon time measurements. The essential consideration has been the speed of travel of sound or similar waves between two known points at one of which the wave is generated and at the other of which it is detected by suitable means. From the data obtained over large areas in this way, the presence of formations giving rise to a different speed of travel of the waves than normal has been predicted. For example, the transmission of a sound wave between two points at a greater speed than is normally expected in the upper surface soil has been found to indicate the presence of a salt dome in the path of the wave through which the latter has been able to travel at a speed of four or five times that in the upper surface soil.

The present invention has to do with the transmission of sound or similar waves through the earth but entirely different characteristics or properties of the media through which the waves travel are observed and depended upon to aid in the location of desired subterranean formations. The present invention contemplates consideration of the coefficients of absorption and reflection of waves transmitted through different media. It is well known that the coefficient of absorption of a sound or similar wave varies not only with the nature of the medium through which the wave is travelling but also with the particular frequency of the wave as well. Thus a wave of a given frequency in travelling through a particular medium will be absorbed to a certain definite extent, depending upon distance travelled, and a coresponding decrease in the amplitude of the wave will be noticeable. On the other hand, the same wave, if passed the same distance through another medium, will be absorbed to a greater or lesser extent, depending upon the absorption properties of the medium. So, also, if two waves of different frequencies are transmitted through a given medium, each will be absorbed and have its amplitude decreased in a particular relation, depending upon the coefficient of absorption for each frequency. In the same way a wave which is reflected from a reflecting surface in its path will be diminished in intensity and amplitude to an extent depending upon the coefficient of reflection from the particular surface, and this coefficient will vary in accordance with the frequency of the wave transmitted.

It is upon this phenomenon of variation in the coefficients of absorption and reflection in accordance with the frequencies of the waves transmitted, as well as the media of transmission or reflection, that the present invention is based. Toward the end of discovering structural variations in the earth's surface, it is proposed to compare the amplitudes of waves of certain determinable frequencies as they are detected at a plurality of different points at or some distance from the source of the waves.

The absorption of wave energy, as is well known, is in accordance with the equation $$I = I_0 e^{-\alpha S}$$

in which I stands for the intensity of the wave at a particular point of observation, $I_0$ is the intensity of the wave at the source, $e$ is the logarithmic base, $\alpha$ is the coefficient of absorption of a wave of a particular frequency in a particular medium and S is the distance of the point of observation from the source of the wave. It will thus be seen that the intensity of a wave in travelling away from its source does not vary directly with the distance but in a logarithmic relation thereto. Furthermore, the intensity of a wave is proportional to the square of its amplitude so that in the above equation we may substitute $A^2$ for I where A stands for the amplitude of the wave.

It would be difficult to determine the amplitude or intensity of a wave as it is emitted from a source so as to enable one to determine the value of $\alpha$ directly from an observation taken at some distance from the source. For this reason it is contemplated by the present invention to effect a comparison of the values of $\alpha$ without actually determining these values. Thus, if a complex wave composed of two or more frequency components is set up at a given point and after travelling a definite distance is observed by suitable instruments at another point so that the amplitudes of the different frequency components may be compared, their ratios will bear a definite relation to the original intensities, depending upon the coefficients of absorption of the different frequencies in the particular medium involved. Now if the same wave could be observed at different points away from the source but at equal distances from the latter, the ratios of the amplitudes of like frequency components should be the same if the medium of transmission were the same. This is for the reason that since the frequencies and the medium are the same with relation to each of the points of observation, the coefficients of absorption will be the same, and since the initial intensity is the same for all, and the distance travelled is the same, the final intensities, and hence the amplitudes of the several components, would be the same. If it were possible to construct detecting and recording instruments exactly alike so that a wave of given intensity would affect all instruments to the same extent, it would only be necessary to observe a wave of a single frequency. However, since each instrument has its own characteristics as to sensitivity, it becomes desirable to eliminate this factor by considering the ratios of different frequency components received by each instrument. Thus while the actual amplitude of a wave of a given intensity as reproduced on different instruments would be different for each, the ratios of the amplitudes of two waves of definite frequencies and intensities as reproduced on the several instruments would be the same. In other words, each instrument in reproducing a given wave would represent it by a different amplitude but all waves reproduced by a single instrument would be in the same proportion. Now it will be clear that if the ratios of the amplitudes of certain frequency components of a complex wave are the same at a series of points equally distant from the source, the transmitting medium must be homogeneous or must at least be the same along each of the paths traversed. On the other hand, if the ratio is found to be different at one or more of the points than at the others, then there is evidence of a difference in the structure of the several wave paths.

As will be explained more fully hereinafter, it is possible also to determine the actual coefficients of absorption of the media through which the waves are transmitted and to predict the presence and nature of intrusive masses from a study of a single record of a simple harmonic wave or a single component of a complex wave.

In carrying out the preferred method, a complex wave, i. e., one having components of several distinct frequencies, is set up at a given source by any suitable means, such as by the detonation of an explosive charge. Suitable detecting devices may then be stationed at various selected points equally distant from the source and may be connected to any suitable form of recording devices which are capable of reproducing the particular wave forms which are being emitted. These records will preferably be formed photographically.

It will be found that the record obtained at each point in this way will contain several impressions of the same wave impulse. For example, one impression or reproduction will be made upon the record from that part of the wave impulse which has travelled directly to the detector through the upper surface soil. Another reproduction will be made by virtue of a portion of the wave impulse which may have travelled downwardly to a greater extent and passed through a more elastic medium, such as a salt dome, for a considerable extent until by refraction it will be directed toward the same detector. Either in addition to or instead of the refracted wave, there may be formed an impression of a reflected wave which has travelled downwardly to a considerable extent to a reflecting surface and thence toward the detector. Still another impression may be created by virtue of a portion of the wave impulse travelling through the air and striking the detector at a later instant.

Since the approximate speed of travel of the wave through the normal upper surface will generally be known, and since the film on which the record has been formed may be made to travel at a substantially uniform rate, it will not be difficult to distinguish between the different impressions on the record. The refracted wave will normally be somewhat in advance of the direct ground wave whereas a reflected wave will nominally be received somewhat subsequent to the surface wave and the air wave will be received still later.

In connection with the preferred mode of carrying out the invention as explained, it is only necessary to consider the first impulse which has been recorded at each point or station. The wave train which has been reproduced from the first impulse may be analyzed by means of any form of harmonic analyzer and the ratio of the amplitudes of any corresponding wave components at the several stations may be compared. If they are all of the same value it may be assumed that the wave paths from the source to all of the stations are of the same structure whereas if one or more of the ratios differ from the rest, the presence of some subterranean deposit in the corresponding paths may be predicted. For example, in certain areas where the presence of a salt dome is suspected the difference in the ratio for one of the paths over that for the other paths may serve to indicate the approximate location of a dome. By then taking a series of similar observations from different angles across the probable location of the dome, its position and extent may be more definitely predicted.

With the foregoing objects and general explanation of the nature of the invention in view, one suitable form and arrangement of apparatus for carrying out the novel method will now be described. It should be understood, however, that the detailed description which follows is only for the purpose of illustration and that many other forms and arrangements of apparatus may be employed in lieu of those disclosed. The description which follows is to be considered in conjunction with the accompanying drawings in which—

Figure 1 is a diagrammatic showing of an arrangement of apparatus suitable for the detection of hidden masses.

Figure 2 is a similar showing in elevation of the path of waves from the source to one of the detectors shown in Figure 1.

Figure 3 is a diagrammatic showing in elevation of the method of locating hidden bodies or faults by means of reflected waves, and Figure 4 is a detail of a record which may be formed at any of the detector stations.

Referring now to Figure 1,—a location designated by the letter A may be adopted as a central station at or near which the explosion or other sound-producing source will be active. Arranged at suitable points at equal distances from the station A, there may be located a number of receiving stations B, C, D, and E. These may be arranged in any suitable way, either in an arc on one side of the station A or in the corners of a square having station A at its center, or around the circumference of a circle. Any number of receiving stations may be employed, one being sufficient but a greater number being preferred, not only to better take advantage of a single explosive charge, but also to provide a better basis for the study and comparison of waves transmitted in various directions. A distance of about five miles between station A and the receiving stations will be found very satisfactory, although shorter or longer distances may be adopted if desired. Suitable radio equipment will preferably be provided at each station, although it is not essential to the employment of the present invention. This radio equipment may comprise a transmitting set 10 and a receiving set 11 having a common antenna 12 at each of the stations. A switch 13 may then be provided to place the antenna in circuit with either the transmitter or receiver, as desired.

Among other things, this equipment may be employed for the purpose of inter-communication between the stations so that all may be notified as to the time when the explosion is to take place and even to indicate the precise instant of the explosion. Furthermore, each of the receiving stations may be provided with a radio compass 14 by means of which a bearing upon the point of explosion may be taken either before or after the explosion has taken place. For this purpose the antenna at station A will be located directly at the point of explosion and a series of signals will be sent out to be picked up by the loops of the several radio compasses. By proper adjustment of the loops until a minimum effect is produced from the signals, the direction toward the point of explosion may be determined and by comparison of this direction with the reading of a magnetic compass needle, the true direction with respect to magnetic north may be determined. Any suitable means may be adopted for determining the distances from the several receiving stations to the point of explosion. For example, a small preliminary air shot may be fired at the point of explosion and the time of travel of the sound through the air to each of the receiving stations may be noted. After suitable correction for the wind velocity and direction, the distances may thus be accurately determined from the known velocity of sound in air. Any slight inaccuracies in the location of the stations may be corrected for either by shifting the detectors to place them the same distance from the source or by taking the differences into consideration in the computations.

After the apparatus at all of the stations has been properly set up and adjusted as determined by the radio communication previously mentioned, a warning signal may be sent out from station A notifying the receiving stations that a sound wave is about to be generated. An instant later a switch or key 15 may be closed and by means of current from a battery 16, an explosive charge 17, buried preferably from ten to twenty feet below the surface of the earth, will be set off. Compressional waves of a complex nature will be emitted in all directions from this point and certain of these waves will reach each of the detectors 18 located at the several receiving stations. These detectors may be of any desired construction, either of electrical or mechanical design. If electrical, they may either be of some special microphone construction or may embody the principles of magneto-electric devices.

In Figure 1, an electrical type of detector is conventionally shown and connections are provided from the latter to a suitable amplifying and recording unit 19. This unit may include any suitable number of stages of vacuum tube amplification from the output side of which connections may be made to any suitable form of oscillograph for photographically recording the waves or impulses received by the detectors. As shown at station B,—in Figure 1, a connection may also be provided from the radio receiver to the oscillograph for the purpose of recording the instant of explosion. The speed of a sound wave through the average surface soil in the region explored being known, and the distance between the point of explosion and the receiving stations having been determined, it is easy to ascertain the instant of explosion from the record produced by the surface wave, it being assumed for this purpose that the record strip travels at a uniform rate or that time marks are formed thereon as it is fed.

Figure 2 illustrates a little more clearly the paths followed by two different complex waves generated upon the explosion of the charge 17. One of these waves or wave trains may follow the straight line path 20 through the substantially homogeneous upper surface soil. Another wave train may follow the path 21 which carries the sound downwardly at a suitable angle until it strikes some portion of a mass 22 of more elastic material, such as a salt dome. Upon entering this new medium, the wave will be refracted and may pass along a path substantially parallel to the upper surface until it reaches a point where a second refraction upon leaving the medium will direct the wave toward the detector 18.

A sample of record which might be produced under the conditions illustrated in Figure 2 is shown in Figure 4. On the photographic record strip 23 there is a line 24 shown which indicates the condition of rest or movement of the oscillograph string and forms a true reproduction of the sound or similar waves picked up by the detector. At the point 25 a sudden bend or break in this line will be noted and this serves to indicate the first instant of receipt of that part of the wave impulse which has followed the course 21. Since the velocity of compressional waves through more elastic materials, such as that of the salt dome 22, is far greater than in the average surface soil, the refracted wave will reach the detector in advance of the surface wave even though its course is of considerably greater length. At 26, a second sudden break in the line 24 will be noted and this will indicate the first instant of receipt of the surface wave following the path 20. Now since the waves generated by the explosion of the charge 17 will be of a complex nature, the wave reproduced in the line 24 will be irregular and will depend upon the nature and phase of the components of the wave of different frequencies. Any suitable form of harmonic analyzer such, for instance, as the "Michaelson" type, may be employed for the purpose of analyzing the waves beginning at the point 25 to determine the amplitudes of the components of different frequencies. If the ratios of the amplitudes of waves of certain definite frequencies are the same as determined from the records at all of the stations, then it may be assumed that all of the wave paths are of the same structure and that no localized subterranean deposits exist. On the other hand, if one or more of the ratios differ from those computed for the remaining stations, a prediction may be made as to the location of some intrusive mass in the one or more paths affected.

In the discussion which has thus far been given, it has been assumed that all that it has been desired to determine is the presence of some hidden mass and its approximate location. If desired, the actual coefficient of absorption of a medium may also be determined. For this purpose a series of the receiving stations may be located along a straight line leading radially from a source of waves and the distances from these stations to the source may be determined. The intensity of waves of certain definite frequencies as received at the several stations may then be noted and the values of the coefficients determined in accordance with the formulæ to be developed presently. Since it is impossible to provide two or more instruments which will produce records of precisely the same amplitude in response to a given wave, the instruments located at the several stations should be mutually calibrated so that a correction factor may be applied to convert all of the results to a common basis. Now if we designate the distances from the source to two stations in a line by the characters S and $S^1$ and the coefficient of absorption of a wave of a given frequency by $\alpha_1$ we may form the two following expressions:

$$I_1 = I_0 e^{-\alpha_1 S}$$
$$I_1^1 = I_0 e^{-\alpha_1 S^1}$$

where $I_0$ is the initial intensity of the wave at the source and $I_1$ and $I_1^1$ are the intensities of the wave after it has travelled the distances S and $S^1$ respectively.

Dividing each equation by $I_0$ and taking the logarithm of both sides, we obtain the following:

$$\log \frac{I_1}{I_0} \text{ or } \log I_1 - \log I_0 = -\alpha_1 S$$

and $$\log I_1^1 - \log I_0 = -\alpha_1 S^1$$

whence by subtraction we get:

$$\log I_1 - \log I_1^1 = -\alpha_1 (S - S^1)$$

Since the values of $I_1$ and $I_1^1$ may be determined from the amplitudes of the recorded waves and since the distances S and $S^1$ may be measured, the value of $\alpha_1$ may readily be computed. In the same way the values of $\alpha_2$, $\alpha_3$, etc. representing the coefficients of absorption of waves of other frequencies in the given medium may likewise be computed.

If all that it is desired to determine is the ratio $$\frac{\alpha_1}{\alpha_2}$$

of two coefficients for different frequencies, it will not be necessary to determine the distances S and $S_1$ at all. Thus where the subscripts 1 and 2 refer to waves of different frequencies:

$$\log I_1 - \log I_1^1 = -\alpha_1 (S - S^1)$$

and $$\log I_2 - \log I_2^1 = -\alpha_2 (S - S^1)$$

so that $$\frac{\alpha_1}{\alpha_2} = \frac{\log I_1 - \log I_1^1}{\log I_2 - \log I_2^1} = \frac{\log A_1^2 - \log A_1^{1^2}}{\log A_2^2 - \log A_2^{1^2}}$$

$$= \frac{2 \log \frac{A_1}{A_1^1}}{2 \log \frac{A_2}{A_2^1}} = \frac{\log \frac{A_1}{A_1^1}}{\log \frac{A_2}{A_2^1}}$$

The ratio of coefficients may therefore be determined directly from the amplitudes of the two different wave components at the two receiving stations.

By conducting experiments first in connection with known media, the values of $\alpha$ for a wide variety of materials and wave frequencies may be charted or compiled in the form of tables and these may later be employed for the purpose of determining the nature of a medium when its coefficient of absorption is determined from actual test.

Furthermore, by the use of the tables compiled as above indicated, or in any other suitable way, advantage may be taken of the two wave impressions formed on the record to aid in determining the average coefficient of absorption of the media through which a refracted wave has passed. Referring to the record reproduced in Figure 4, it will be clear that the wave impression beginning at the point 26 which results from that portion of the wave which has travelled through the upper surface soil may be analyzed to determine the amplitude of any desired frequency component. Now, in any given territory where a survey of the character proposed is being conducted, the surface soil will be found to be substantially uniform and its coefficient of absorption $\alpha_1$ for the particular frequency component measured may be determined from the empirical tables. Therefore, in the expression: $\log I_1 - \log I_0 = -\alpha_1 S$ all of the quantities may be determined with the exception of $I_0$. The equation may accordingly be readily solved for the value of this unknown, it being understood that the distance S is determined and the value of $\log I_1 = \log A_1^2$ or $2 \log A_1$ is computed from the measured wave amplitude.

By now analyzing the refracted wave impression beginning at the point 25 (Figure 4), the amplitude $A_2$ of the same frequency component after it has followed the path 21 (Figure 2) may be measured. This leaves only the value $\alpha_x$ of the average coefficient of absorption unknown in the equation,—

$$\log I_2 - \log I_0 = -\alpha_x S$$

whence,—

$$\alpha_x = \frac{\log I_0 - 2 \log A_2}{S}$$

where $I_0$ has the value determined above from the analysis of the surface wave depression. From this computed value of the average coefficient of absorption of the path 21, some indication is given as to the nature and extent of some refracting medium which forms a part of the path. Obviously, the direct comparison of the values of $A_1$ and $A_2$ representing the amplitudes of the same frequency component of the impressions beginning at 26 and 25 respectively will also give some indication of the two different paths of the waves.

In Figure 3 there is disclosed an arrangement of the stations which may be adopted for the purpose of detecting a fault line or an intrusive mass in a hidden surface by virtue of the coefficients of reflection of various waves. For this purpose the several receiving stations will preferably be placed along a straight line extending radially from point of explosion and somewhat closer to the latter than under the arrangement illustrated in Figure 1. Upon the explosion of a charge 27 by the depression of a key 28, a series of complex waves will be generated and a portion of these may follow the path 29 downwardly to the reflecting surface 30 and back to the detector 31 at station B, so as to produce a record upon the oscillograph 32. Another portion 33 of the complex waves may strike a different portion 34 of the reflecting surface and be directed toward the detector 31 at station C. Now, if we assume that the portions 30 and 34 are of such different nature as to have different coefficients of reflection, this fact will be brought out in the records at the stations B and C, due to the unexpected difference in the ratio of amplitudes of the selected frequency components of the complex wave.

The method of determining the intensity or amplitude of a given frequency component at the source A from the surface impression, whereby the change in the amplitude due to reflection may be noted as explained in connection with the refracted waves, will be applicable here as well.

Should the area under survey be of such formation as to present two separate reflecting surfaces separated by the thickness of the first reflecting material, each of the detectors or certain of them will indicate this fact by means of an additional impression, on the record, of the wave impulse. An analysis and study of the wave amplitudes of each of the reflected wave impressions will serve to indicate the nature of the several media.

In connection with all of the foregoing discussion, it should be noted that no reliance is placed upon the actual speed of travel of the waves through the different media, so that there is little occasion in the conduct of the novel method herein disclosed to measure time with extreme accuracy. The usual time lines which have been found essential to the older methods of geophysical exploration, may be dispensed with under the new method. In the determination of the frequencies of the waves reproduced on the photographic record, the time element may be gauged with sufficient accuracy from the known speed of travel of the record strip itself. So also the determination of distances by means of the time intervening between the explosion and the receipt of either the air wave or the upper surface wave may be determined with sufficient accuracy from the known speed of movement of the record strip. Should it be found desirable in working at closer ranges to provide greater accuracy in determining the time element for either of the purposes mentioned or for any other reason, any suitable means may be employed for indicating intervals, such as one one-hundredth (1/100) of a second on the record strip.

While certain specific disclosure has been given regarding the novel method and suitable apparatus for carrying it out, it will be understood that many variations and modifications may be made, all of which fall within the scope of the claims which follow.

The invention herein described may be manufactured and used by or for the Government of the United States for governmental purposes without the payment to me of any royalty thereon or therefor.

What I claim is:

1. A method of surveying subterranean strata which comprises generating a train of complex compressional waves, reproducing the form of said waves on a record as they reach a point remote from the generating source and the analysis of the records of the complex waves into their components.

2. A method of surveying subterranean formations which comprises generating a train of complex compressional waves, reproducing the form of said waves on a record as they reach a point remote from the generating source, and measuring the amplitude of components of said waves of different frequencies.

3. A method of surveying subterranean formations which comprises generating a train of complex waves, and measuring the amplitude of components of said waves of different frequencies at a distance from the generating source.

4. A method of surveying subterranean formations which comprises generating a train of complex waves, and measuring the amplitude of components of said waves of different frequencies at a plurality of points at a distance from the generating source.

5. A method of surveying subterranean formations which comprises generating a train of complex waves, and measuring the amplitude of components of said waves of different frequencies at the source and at a distance from the generating source.

6. A method of surveying subterranean formations which comprises generating a series of complex waves near the surface of the earth and analyzing said waves into their different components after they have travelled over a plurality of different paths.

7. A method of surveying subterranean formations which comprises generating a series of complex waves in the upper surface of the earth and measuring the amplitudes of different components of said waves at the source of generation and at a point remote from the source.

8. A method of surveying subterranean formations which comprises generating a series of waves in the upper surface of the earth, reproducing the form of said waves on a record as they reach a point at a known distance from the generating source and analyzing said record to measure the coefficient of absorption of the medium through which the waves have travelled.

9. A method of surveying subterranean formations which comprises generating a series of waves in the upper surface of the earth, reproducing the form of said waves on a record as they reach a point at a known distance from the generating source and analyzing said record to measure the coefficient of reflection of the medium through which the waves have travelled.

HARVEY C. HAYES.